US012005690B2

(12) United States Patent
Begalli et al.

(10) Patent No.: US 12,005,690 B2
(45) Date of Patent: Jun. 11, 2024

(54) VEHICLE INTERIOR COMPONENT

(71) Applicant: KARMA AUTOMOTIVE LLC, Irvine, CA (US)

(72) Inventors: Adelaide Begalli, San Mateo, CA (US); Andre Franco Luis, Orange, CA (US); Steve Ingram, Lake Forest, CA (US)

(73) Assignee: Karma Automotive LLC, Irvine, CA (US)

( * ) Notice: Subject to any disclaimer, the term of this patent is extended or adjusted under 35 U.S.C. 154(b) by 705 days.

(21) Appl. No.: 16/379,579

(22) Filed: Apr. 9, 2019

(65) Prior Publication Data
US 2020/0324509 A1 Oct. 15, 2020

(51) Int. Cl.
B32B 3/30 (2006.01)
B32B 7/022 (2019.01)
B60R 13/02 (2006.01)
B60N 2/75 (2018.01)

(52) U.S. Cl.
CPC ............... *B32B 3/30* (2013.01); *B32B 7/022* (2019.01); *B60R 13/02* (2013.01); *B32B 2605/003* (2013.01); *B60N 2/75* (2018.02)

(58) Field of Classification Search
CPC ..... B32B 3/30; B32B 7/022; B32B 2605/003; B60R 13/02
See application file for complete search history.

(56) References Cited

U.S. PATENT DOCUMENTS

| 6,256,038 B1* | 7/2001 | Krishnamurthy | G06T 11/203 345/419 |
| 8,505,997 B2 | 8/2013 | Hipshier et al. | |
| 2009/0295011 A1* | 12/2009 | Smith | B29C 45/14811 264/101 |
| 2012/0193933 A1* | 8/2012 | Spitler | B62D 25/14 296/74 |
| 2014/0021733 A1* | 1/2014 | Hipshier | B60R 13/0262 296/1.08 |
| 2014/0167435 A1* | 6/2014 | Sherburn | B60N 2/793 296/1.08 |
| 2015/0097392 A1* | 4/2015 | Locke | B60N 2/787 296/153 |
| 2015/0258939 A1* | 9/2015 | Hipshier | B60R 7/04 160/229.1 |

* cited by examiner

*Primary Examiner* — Tong Guo
(74) *Attorney, Agent, or Firm* — Honigman LLP; Grant Griffith

(57) ABSTRACT

A vehicle interior component including a patterned padding surface positioned proximate to an occupant of the vehicle. The component includes a substrate layer with a plurality of padding projections and an exterior layer connected to the substrate layer and including a plurality of gaps matching the location of the substrate layer's plurality of padding projections. Each of the plurality of padding projections aligns with one of the plurality of gaps and is exposed above the exterior layer to thereby form a pattern of padding on the surface of the vehicle interior component.

9 Claims, 4 Drawing Sheets

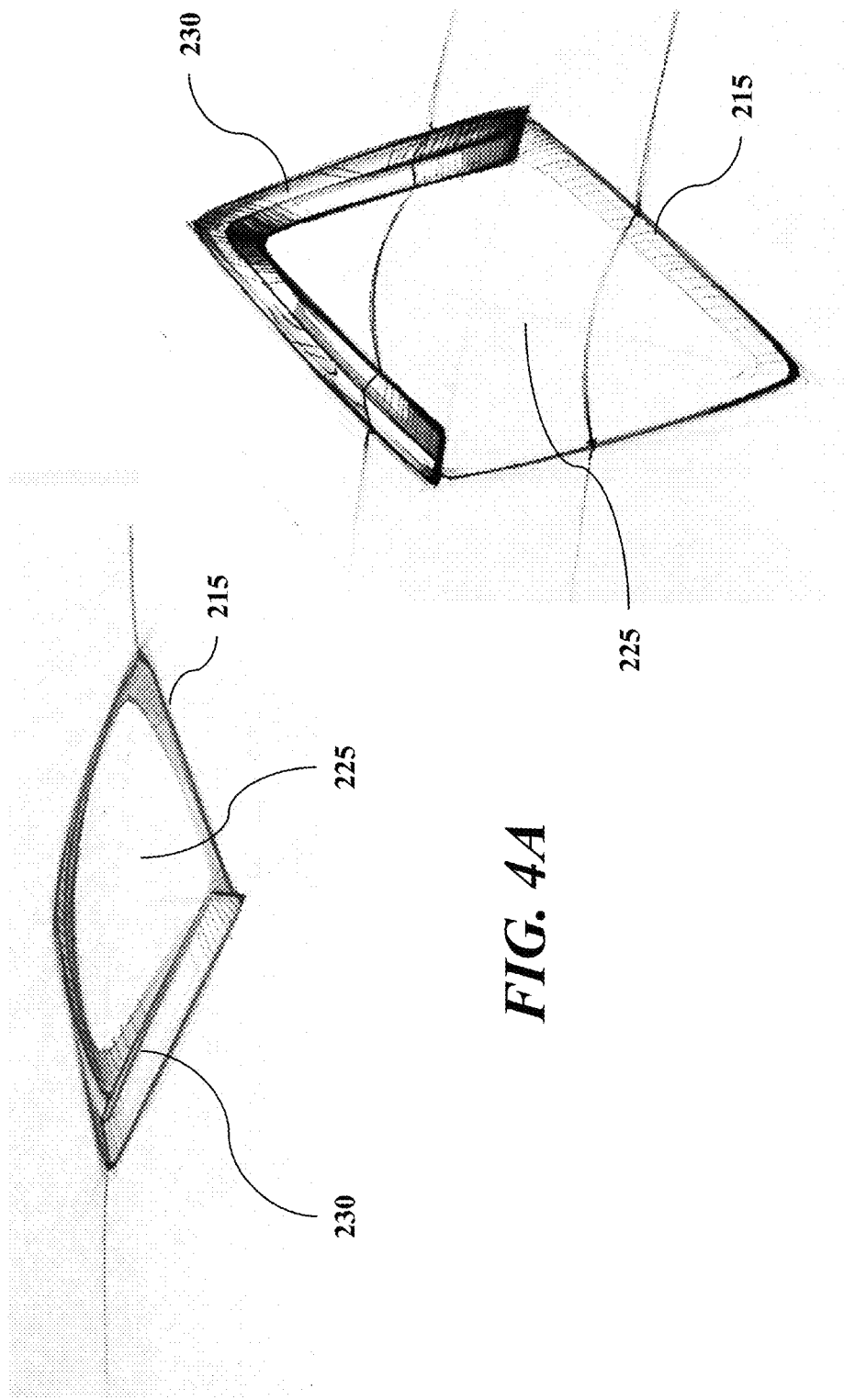

VEHICLE INTERIOR COMPONENT

BACKGROUND

The present application relates to a vehicle interior component such as, for example, a vehicle armrest including a pattern of padding projections and a method for manufacturing the same.

Vehicle interiors commonly use trim materials for decoration, style and comfort. Often, these trim materials are assembled as separate components to be inset or clipped into a primary interior panel. This assembly and installation process increases the chance for assembly error and increases the assembly time of a vehicle.

It would be desirable to find an integrated padding for the surface of a vehicle interior component that may be assembled while minimizing the number of parts and the amount of traditional trimming based assembly required.

SUMMARY

Disclosed herein is a vehicle interior component with a pattern of padding and a method for manufacturing the same. In one embodiment, the patterned vehicle interior component includes a substrate layer with a plurality of padding projections and an exterior layer connected to the substrate layer and including a plurality of gaps. In one embodiment, the location of the exterior layer's plurality of gaps matches the location of the substrate layer's plurality of padding projections so that each of the plurality of padding projections aligns with one of the plurality of gaps and is exposed above the exterior layer to thereby form a pattern of padded material on the surface of the vehicle interior component.

In another disclosed embodiment, the substrate layer comprises a compressible material that provides padding to an occupant of the vehicle. In another disclosed embodiment, the substrate layer comprises a pliable material. In another disclosed embodiment, the substrate layer includes a covering.

In another disclosed embodiment, the exterior layer comprises a rigid material. In one disclosed embodiment, the exterior layer comprises forged carbon.

In another disclosed embodiment, at least a portion of at least one of the plurality of gaps is lined by an accent piece. The accent piece may comprise a rigid material. In one embodiment, the accent piece is unfinished. In another embodiment, the accent piece may be finished with paint, plating, or another coating.

In another disclosed embodiment, the pattern on the surface of the vehicle interior component is designed using an algorithm to create a parametric design that follows the form of the patterned vehicle interior component.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 4A and 4B are perspective views of two exemplary embodiments of a gap in an exterior surface of a vehicle interior component with a padded projection that is lined by an accent piece.

DETAILED DESCRIPTION

A detailed description of a vehicle interior component such as an armrest that includes a pattern of padded projections and a method for manufacturing the same.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
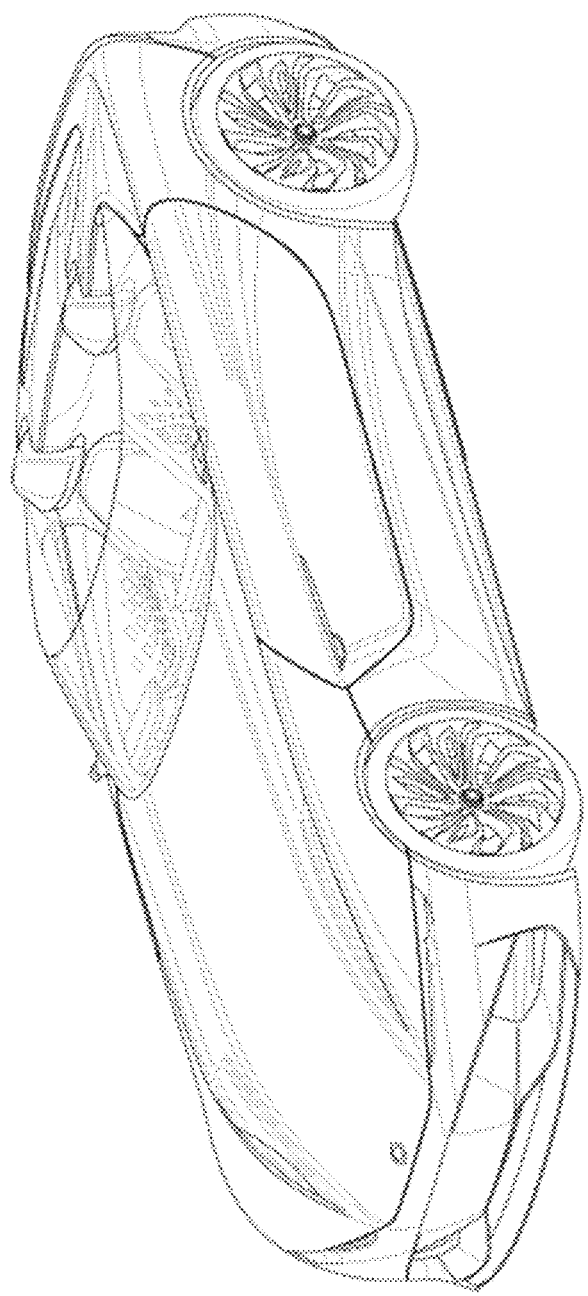
FIG. 1 is a perspective view of an exemplary embodiment of a vehicle in which a patterned vehicle interior component may be installed.

FIG. 1 is a perspective view of an exemplary embodiment of a vehicle 100 in which an armrest 200 with integrated parametric padding may be installed. The vehicle 100 shown in FIG. 1 is exemplary. The vehicle armrest 200 described herein may be used with any passenger vehicle or other vehicle with interior surfaces to be padded and/or decorated. In addition, the patterned surface described herein may be employed on any suitable surface of the vehicle interior such as, for example, door trim, bolster, instrument panel, etc.

Figure 2:
FIG. 2 is a perspective view of an exemplary embodiment of a vehicle interior which includes a vehicle interior component with integrated parametric padding is installed.

FIG. 2 is a perspective view of an exemplary embodiment of a vehicle interior in which a vehicle armrest 200 is installed. As shown in FIG. 2, for example, the vehicle armrest 200 may be located on the interior of a door or on a support surface of the center console between vehicle seats. According to one embodiment, the patterned padding surface may be located on a substantially flat or curved smooth surface. The planar surface includes the padded portions which are integrated into the armrest and project upwardly from the smooth surface. The surface of the vehicle armrest 200 may include a parametric pattern of projections. An algorithm may be used to create a parametric design for the pattern of projections on the vehicle armrest 200 such that the pattern follows the form of the vehicle armrest's surface or any other irregularly shaped vehicle interior surface.

Figure 3:
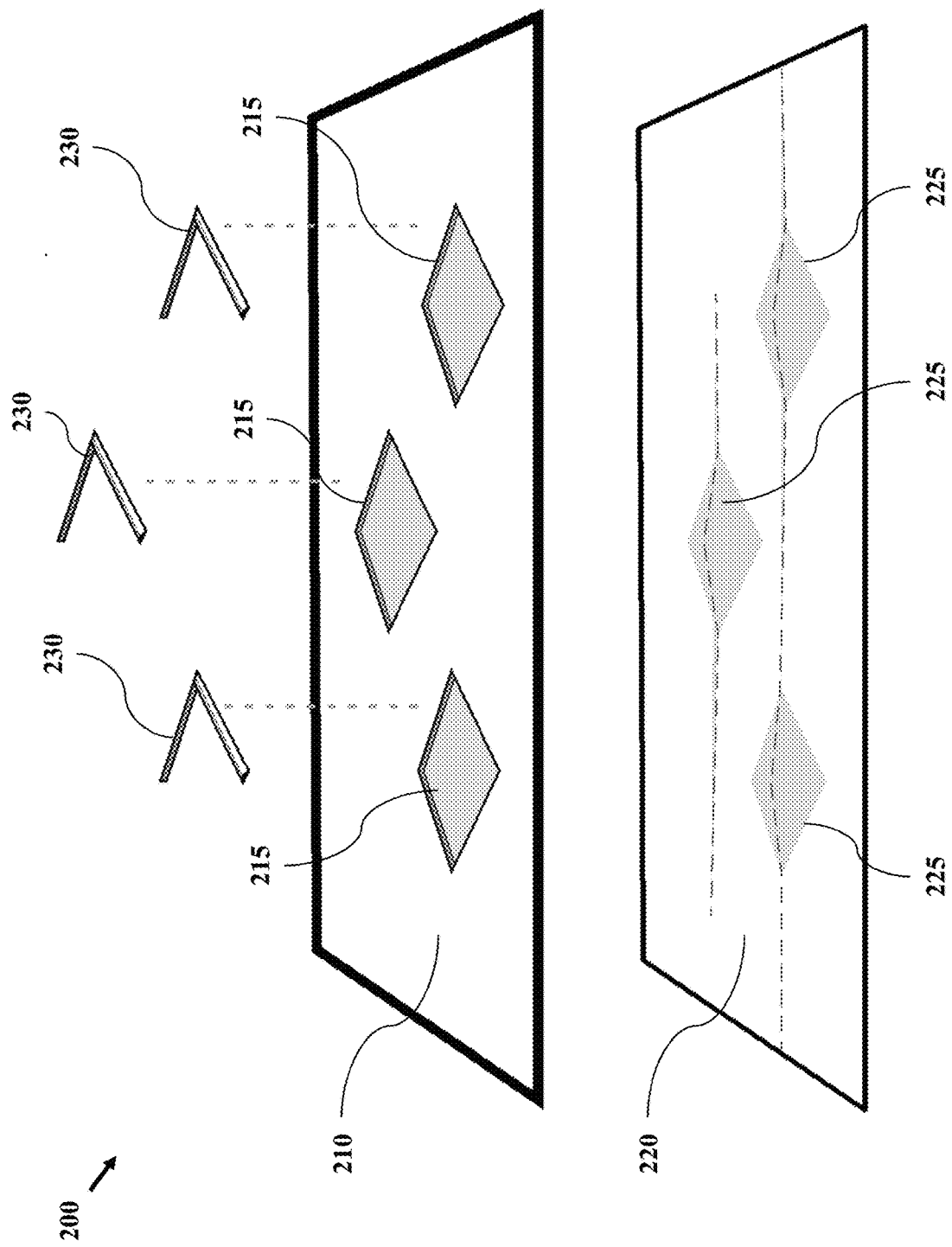
FIG. 3 is an exploded view of an exemplary embodiment of the components comprising a patterned vehicle interior component.

FIG. 3 is an exploded view of an exemplary embodiment of the various parts of the patterned vehicle armrest 200. The armrest includes a core material and several overlying layers. For example, an exterior layer 210 may overlie a substrate layer 220. The exterior layer 210 may include a plurality of gaps 215 and the substrate layer 220 may include a plurality of projections 225. The gaps 215 may be formed in any suitable shape such as, for example, square, circle, diamond, etc. Each of the plurality of projections 225 may be positioned to correspond and pass through one of the plurality of gaps 215. When the exterior layer 210 and the substrate layer 220 are connected, each of the plurality of projections 225 is aligned with one of the plurality of gaps 215 and is exposed above the exterior layer 210 (preferably at a positive offset) to thereby form a pattern of padding on the surface of the vehicle armrest 200.

When the patterned padding is applied to a vehicle trim component such as for example, armrest, pillar trim, instrument panel or the like, the various layers described herein are positioned over a core material which may be, for example, steel, plastic or other material suitable for the particular structure being covered by the integrated padding described herein.

According to an exemplary embodiment, the exterior layer 210 is formed of a rigid material such as, for example, forged carbon fiber. According to an exemplary embodiment, the substrate layer 220 comprises a compressible material suitable for padding such as milling foam or skiving leather. The substrate layer 220 may comprise a pliable material. The substrate layer 220 may further include a covering, such that when the patterned vehicle armrest 200 is assembled, the exposed portions of the substrate layer 220 have a different texture or appearance than the rest of the substrate layer 220. The layers 210, 220 are connected together using a suitable mechanism such as pressure, brackets, glue, heat welding, etc. depending on the intended application. The thickness of the exterior layer 210 may be between 1 and 2 mm. Once assembled, it may be desirable for the substrate layer 220 to be at a positive offset of the exterior layer 210.

According to an exemplary embodiment, each of the plurality of projections 225 may be glued to the substrate layer 220 during the trimming process of assembling the vehicle interior. According to another embodiment, the substrate layer 220 may be embossed and back injected to produce the plurality of projections 225.

According to one embodiment, at least a portion of at least one of the plurality of gaps 215 may be lined by an accent piece 230. The accent piece 230 may comprise a rigid material. In one embodiment, the accent piece 230 is unfinished. In another embodiment, the accent piece 230 may be finished with paint, plating, or another coating. The accent piece 230 may be positioned flush with the exterior layer 210 in order to not extend above the surface of the exterior layer 210.

FIGS. 4A and 4B are perspective views of two exemplary embodiments of one of the plurality of gaps 215 with one of the plurality of projections 225 that is lined by one of the plurality of accent pieces 230. The surface of the one of the plurality of projections 225 may project above the surface level of the one of the plurality of gaps 215. The one of the plurality of accent pieces 230 may also project above the surface level of the one of the plurality of gaps 215.

While this disclosure has been particularly shown and described with references to exemplary embodiments thereof, it will be understood by those skilled in the art that various changes in form and details may be made therein without departing from the scope of the claimed embodiments.

What is claimed is:

1. A vehicle interior component including a patterned padding surface positioned proximate to an occupant of the vehicle comprising:
   a substrate layer with a plurality of padding projections; and
   an exterior layer connected to the substrate layer and including a plurality of gaps, wherein each of the gaps are aligned with one of the plurality of padding projections and wherein each of the padding projections pass through an opening located in one of the gaps, and wherein each of the padding projections is exposed above the exterior layer to thereby form the patterned padded surface on the vehicle interior component.

2. The interior component of claim 1, wherein the substrate layer comprises a compressible material.

3. The interior component of claim 1, wherein the substrate layer comprises a pliable material.

4. The interior component of claim 1, wherein the substrate layer includes a covering.

5. The interior component of claim 1, wherein the exterior layer comprises a rigid material.

6. The interior component of claim 1, wherein the exterior layer includes boundary edges surrounding the opening of each of the plurality of gaps, and wherein at least a portion of the boundary edges of at least one of the plurality of gaps is lined by an accent piece.

7. The interior component of claim 6, wherein the accent piece comprises a rigid material.

8. The interior component of claim 6, wherein the accent piece is finished with paint, plating, or another coating.

9. The interior component of claim 6, wherein the pattern on the surface of the interior component is designed using an algorithm to create a parametric design that follows the form of the interior component.

* * * * *